US005301263A

United States Patent [19]

Dowdell

[11] Patent Number: 5,301,263

[45] Date of Patent: Apr. 5, 1994

[54] HIGH MEMORY BANDWIDTH SYSTEM FOR UPDATING Z-BUFFER VALUES

[75] Inventor: Charles R. Dowdell, Fort Collins, Colo.

[73] Assignee: Hewlett-Packard Company, Palo Alto, Calif.

[21] Appl. No.: 584,066

[22] Filed: Sep. 18, 1990

[51] Int. Cl.[5] .......... G06F 3/14

[52] U.S. Cl. .......... 395/122; 395/121

[58] Field of Search .......... 395/122, 163, 164, 165, 395/131, 121

[56] References Cited

U.S. PATENT DOCUMENTS

| | | | |
|---|---|---|---|
| 4,813,002 | 3/1989 | Joyce et al. | 365/49 |
| 4,907,174 | 3/1990 | Priem | 395/122 |
| 4,914,582 | 4/1990 | Bryg et al. | 395/425 |
| 4,951,232 | 8/1990 | Hannah | 395/122 |
| 4,958,302 | 9/1990 | Fredrickson et al. | 395/165 |
| 4,961,153 | 10/1990 | Fredrickson et al. | 395/122 |
| 5,038,297 | 8/1991 | Hannah | 395/164 |
| 5,068,808 | 11/1991 | Wake | 395/119 |

*Primary Examiner*—Gary V. Harkcom
*Assistant Examiner*—Mike Smith

[57] ABSTRACT

A system updates the z-values corresponding to pixels of a computer graphics screen. An integral part of the system comprises a controller/memory module which employs preliminary determinations as to whether or not a z-value has been previously stored for a pixel, multiple comparators, and partial read and write operations to achieve a significantly higher memory bandwidth. The bandwidth can be further increased by configuring a plurality of such modules in a parallel architecture.

14 Claims, 3 Drawing Sheets

HIGH MEMORY BANDWIDTH SYSTEM FOR UPDATING Z-BUFFER VALUES

BACKGROUND ART

Contemporary computer graphics devices are widely used to display images of objects based on computer supplied data that represent these objects. In such devices, the screen is subdivided into a large number of pixels, where each pixel can be associated with an (x,y) coordinate pair of an xy-plane corresponding to the screen. In order to draw objects that shadow each other (i.e., a situation in which one object appears in front of and therefore blocks the view of part of another object), a z-axis is also defined, pointing into the plane of the screen. Each pixel is associated with a z-value that indicates the depth of the object to be drawn at that pixel location. The z-value for each pixel, represented for example by a 24 bit binary number, is stored in a z-buffer memory location. Hence, associated with each pixel are two quantities: the color, which may be gray-scale intensity in the case of monochromatic images, and the depth, or z-value, of the object to be drawn at that pixel location.

Typically, the displayed image evolves, or changes with time, either with the entire image being replaced by another image so that a sequence of images is displayed or with only certain pixels changing. As an example, suppose that an object is to be added to an existing image, where parts of this new object are to be drawn such that they appear behind other existing objects. Each of the pixel locations corresponding to the portion of the screen spanned by the new object undergoes the following: First, the z-value which corresponds to the image existing on the screen (i.e., the old z-value) is read from the z-buffer memory. This old z-value is then compared with the z-value corresponding to the object to be drawn (i.e., the new z-value). If the new z-value is less than the old z-value, so that the object to be drawn is in front of the existing image at the pixel location in question, then the new z-value is written to the z-buffer memory, thereby replacing the old z-value. In addition, the new color value is drawn on the screen at that pixel location. If, on the other hand, the new z-value is greater than the old z-value, so that the new object is behind the existing image at that pixel location, then the old z-value remains in memory and the new z-value is discarded. The new color value is not drawn on the screen. Finally, if the two z-values are equal, then the new color value may or may not be drawn on the screen depending on some predetermined convention. Hence, in general a three-step process is carried out in updating a pixel location: reading the z-buffer memory, comparing the old and new z-values, and possibly writing the new value to the memory.

Naturally, in graphics applications the desired effect is achieved only if the updating operation is carried out at high speed. Defining the bandwidth of a memory device as the number of bits per unit time that can be processed by the memory, it is desirable to have as high a bandwidth as possible.

SUMMARY OF THE INVENTION

The z-value updating system of the present invention is characterized by a significantly higher memory bandwidth than systems of the prior art. The typical prior art three step z-buffer updating operation involves, for each updated pixel, the access of 48 bits from/to memory, 24 for the read operation and 24 for the write operation, and a 24 bit comparison.

In accordance with one feature of the invention, in updating a z-value for a particular pixel address, a controller receiving a new z-value and pixel address first determines whether or not a valid z-value has been previously stored at this address by checking a single bit for that pixel address. If none has been stored, the new z-value is written to memory without the need for a memory read or z-value comparison. If, however, a valid z-value is stored at the pixel address, the controller initiates an updating operation.

In accordance with a further feature of the invention, portions of the previously stored and new z-values are compared sequentially, with each comparison determining whether a next comparison is to be performed, whether to write any part of the new z-value to memory, or whether to end the updating operation. For a given memory bandwidth, rather than performing single-pixel, multibyte memory accesses for comparison, individual bytes representing portions of a number of different multiple-byte z-values may be accessed in parallel. Because decisions may at times be made based on comparisons of only the most significant bytes, complete sequential accesses for many pixels are not required, and a significant number of accesses of the least significant bytes are avoided. Further, the comparisons which are performed are of only single bytes rather than of full 24 bit z-values.

One consequence of updating only certain portions of a particular z-value is that a decision must be made as to when to reverse the direction of the data path leading to/from memory. This is in contrast to the prior art method, in which the data path is always reversed after the old z-value is read from memory. So as to minimize this decision time, decisions to read additional bytes of pixels are based on a rapid equality comparison. Write decisions are based on a slower greater than or not greater than comparison, but the memory is set in the write mode by the parallel equality comparison.

Several aspects of this updating method yield a higher memory bandwidth. First, with the single-bit check, a substantial amount of time can be saved in making the preliminary determination as to whether or not a z-value has previously been stored at a given address. Second, fewer memory accesses on average are required. That is, instead of entire z-values being read from memory, compared, and written to memory, partial read, compare and write operations may be performed as necessary. Third, comparisons between the previously stored and new z-values are accomplished by decomposing a time-consuming but necessary comparison into two comparisons—one fast and one slow—which are performed in parallel. The fast comparison alleviates the reduction in speed caused by having to decide when to reverse the data path to/from memory.

At the heart of the preferred implementation of the present system is a controller/memory module. The controller comprises memory access means, two comparators, two first-in-first-out (FIFO) buffers, a state machine unit, and RAS and CAS circuitry necessary for accessing memory.

A number of these controller/memory modules can be incorporated as part of a parallel architecture so as to enhance memory bandwidth. In such an architecture, each pixel of a graphics screen is preassigned one of the controller/memory modules. An assignment unit receives the new z-value and its associated z-buffer address and subsequently assigns the pixel to one of the controller/memory modules. With this assignment, the new z-value is placed in two FIFO buffers, a FIFO of the selected controller/memory module and a central FIFO that documents the activities of the set of controller/memory modules. As the new z-value emerges from the FIFO belonging to its controller/memory module, it is updated using the method described above. Once the update is complete, the central FIFO is notified as to the update results. Note that a central FIFO is used in order to overcome the effects of out-of-order completion by the controller/memory modules.

When the entry at the front of the FIFO has been notified as to the update results, its comparison results are made available to a color update unit. The color update unit simultaneously receives from a source, such as a computer, the color value and pixel address that corresponds to the update results received from the central FIFO and, using the update results, determines whether the color is to be rendered on a graphics screen.

DETAILED DESCRIPTION OF THE INVENTION

I. Basic Method and Apparatus

Figure 1:
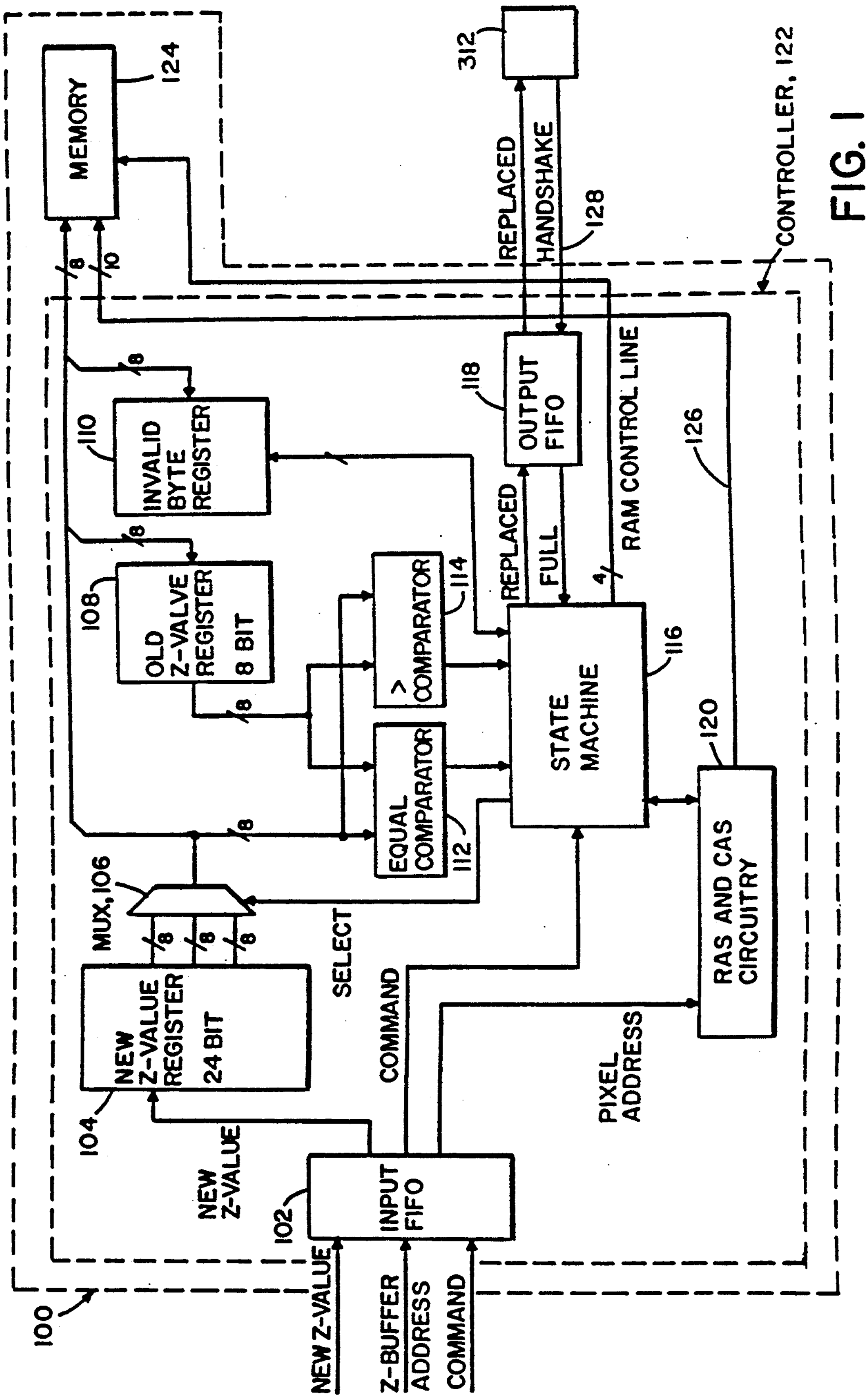
FIG. 1 is a block diagram of the controller/memory module comprising the heart of the invention.

The invention will now be described in connection with FIGS. 1-3. FIG. 1 is a block diagram of the controller/memory module 100 of the invention which performs the three-step updating operation (i.e., read, compare, write) for a given pixel. As seen in the figure, the module comprises a controller 122 which in turn comprises an input FIFO 102, an output FIFO 118, a register 104 to hold the 24 bit new z-value, a multiplexer 106 to select a particular byte of the new z-value, a register 108 to hold a byte of the old z-value, a register 110 to store validity bits, an equality comparator 112, a greater than/not greater than comparator 114, a state machine 116, and row address strobe (RAS) and column address strobe (CAS) circuitry 120.

An incoming z-buffer address, new z-value, and command, as provided by a source such as a computer, are stored as an entry in the input FIFO 102. Here, the command serves as an indication from the computer to the controller 112 that the incoming pixel address is to be updated with the new z-value, if necessary. However, in general, the command bus could contain more general instructions to the controller.

Upon emerging from the FIFO 102, the new z-value is stored in register 104. At the same time, the command is sent to the state machine 116, and the z-buffer address is sent to the RAS/CAS circuitry 120. The RAS/CAS circuitry 120, the use of which is standard in graphics hardware, compares the z-buffer address with the current row address. If they match, then the z-buffer column address is supplied to the memory unit 124 over data line 126. If they do not, a RAS cycle that changes the current row address is initiated prior to providing the memory 124 with the z-buffer column address.

For a given z-buffer address, the memory 124 contains not only a z-value stored in memory but also an INVALID bit. The value of the INVALID bit for a particular pixel indicates whether or not the corresponding z-value memory location has a valid z-value stored in it, with a value of '0' indicating that it does and a value of '1' indicating that it does not.

As soon as the memory 124 has received this pixel address from the RAS/CAS circuitry 120, the contents of the INVALID byte register 110 are examined. If the register 110 contains an INVALID byte of which one bit is the INVALID bit for the current pixel, then the value of the INVALID bit is examined. However, if the INVALID byte stored in the register does not contain the INVALID bit for the current pixel, the INVALID byte is written to memory and the desired INVALID byte is then read from memory and stored in the register 110. The value of the INVALID bit for the current pixel is then examined.

If the value of the INVALID bit equals '1', then an old z-value does not exist and hence the new z-value must be written to memory. In addition, the value of the INVALID bit for the current pixel is set to '0'. Note that in an alternate embodiment, if INVALID='1', the new z-value is not immediately written to memory. Instead, the new z-value is compared to a constant value, with the result of the comparison determining whether the new z-value or the constant value is written to memory. As in the preferred embodiment, the value of the INVALID bit is set to '0'. If INVALID='0', then an old z-value does exist in memory and the entire z-value updating procedure must be executed.

In this case, portions of the new z-value supplied to register 104 are compared with corresponding portions of the old z-value, which is read from memory 124 as necessary. The result of each comparison determines whether or not additional memory accesses and comparisons are to take place.

Figure 2:
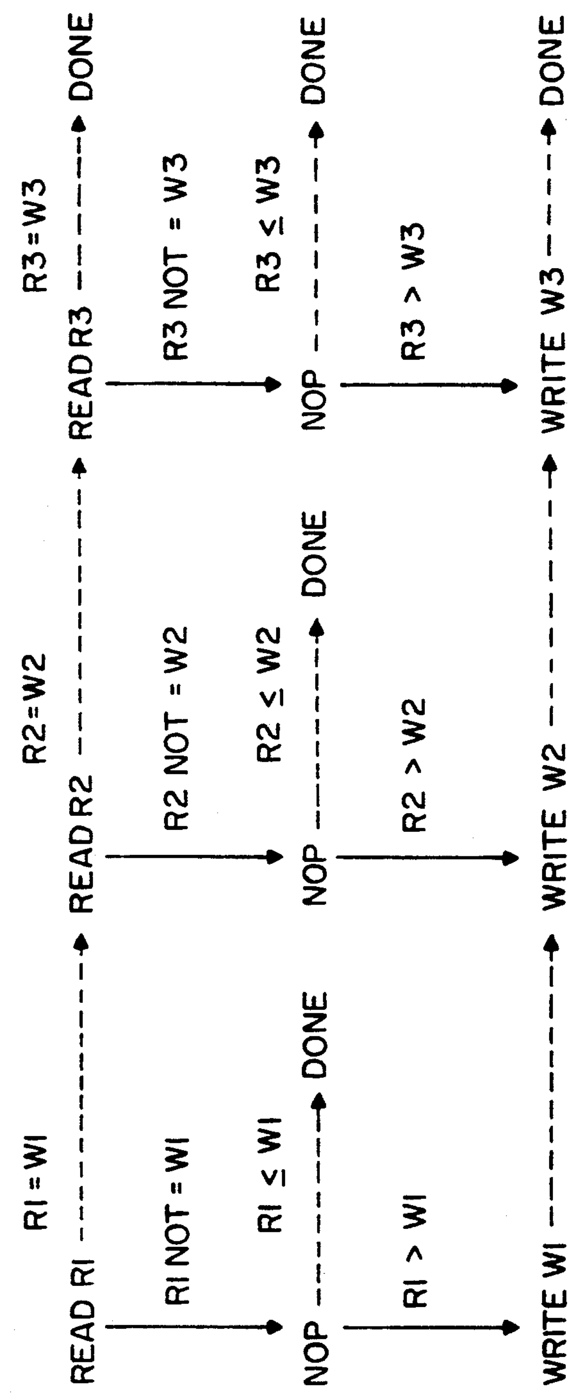
FIG. 2 is a state diagram describing the operation of the state machine 116 of FIG. 1.

To be specific, FIG. 2 is a state diagram of the state machine logic 116 shown in FIG. 1 and depicts the method of the updating operation in the case that INVALID='0'. The most significant, middle significant, and least significant bytes respectively of the old 24 bit z-value read from the z-buffer memory are denoted by R1, R2, and R3. The corresponding bytes of the new 24 bit z-value that may be written to the memory to replace the old z-value are denoted by W1, W2, and W3. Finally, a relation between corresponding bytes of the old and new z-values which indicates that a write is required must be designated. In the following description the relation greater than (>) will be used as a specific example, and this greater than comparison will be referred to as a magnitude comparison throughout so as to distinguish it from an equality comparison. However, note that any relation operator (e.g., less than, greater than or equal to) can be used depending on the particular application.

Referring to FIG. 2, note that all 24 bits of the old and new z-values are not processed at once. First, the most significant byte (MSB) R1 is read from memory 124 and stored in register 108. W1 is obtained from register 104 by means of multiplexer 106, whose select line is controlled by the state machine 116. If R1 does not equal W1 as determined by equality comparator 112, the "nop" state is entered. The "nop" state is a wait-state during which the direction of the data path leading to/from memory is established, as described below in further detail. Subsequently, the "0" operation (which in this example is the greater than/not greater than comparison) must be carried out. If R1>W1, as determined by comparator 114, then the entire 24 bit old z-value is greater than the entire 24 bit new z-value, and consequently the entire 24 bit new z-value consisting of bytes WI, W2, and W3 must be written to memory 124. However, if R1≦W1, then the old 24 bit z-value is less than the new 24 bit z-value, indicating that the new value should not be written to memory. In this case, the updating operation is terminated immediately, as indicated by the "done" state of FIG. 2.

Further comparision is required only if R1 equals W1. In that case, R2 is read from memory. If R2 does not equal W2, then the "nop" state is entered, after which the greater than/not greater than comparison must be performed by comparator 114. If R2>W2, then the entire 24 bit old z-value is greater than the entire 24 bit new z-value, and as a result bytes W2 and W3 must be written to memory. (W1 need not be written to memory since it equals R1 which is already in memory.) However, if R2≦W2, then the old 24 bit z-value is less than the new 24 bit z-value, indicating that the new value should not be written to memory; consequently, the "done" state is entered.

If R2 equals W2, then R3 is read from memory. If R3 equals W3, then the old and new z-values are equal and the new z-value is not written to memory, thereby ending the update operation. If R3 does not equal W3, then the "nop" state is entered, after which the greater than/not greater than comparison must be performed. If R3>W3, then the entire 24 bit old z-value is greater than the entire 24 bit new z-value, and consequently W3 must be written to memory. (W1 and W2 need not be written to memory since they equal R1 and R2, respectively, which are already in memory.) However, if R3≦W3, then the old 24 bit z-value is less than the new 24 bit z-value, indicating that the new value should not be written to memory. Also, the "done" state is entered.

At this point, the updating operation is complete, having been completed by either of two ways depending on the value of the INVALID bit. That is, for INVALID='1', the update is completed when the new z-value has been written to memory. For INVALID='0', the update is completed when the "done" state has been reached. The results of the update operation, i.e., whether or not the z-value was replaced in memory, are then placed on the output FIFO 118 to be made available externally (see Section III). The external device 312 via data line returns a handshake signal to the output FIFO 118 over data line 128 to indicate that the update results were received.

II. Discussion of Memory Bandwidth Increase

As is apparent from Section I and, in particular, FIG. 2, the read/compare/write operation requires at most four memory accesses, or cycles (e.g., R1, R2, W2, W3). This is in contrast with prior art methods, which require that six bytes be accessed to/from memory: all 24 bits (3 bytes) of the old z-value must be read and all 24 bits of the new z-value must be written.

Being able to access four bytes (in the worst case) instead of six (also in the worst case) directly translates into an increase in memory bandwidth. To demonstrate this increase, let each read or write operation (either 8 bit or 24 bit) be of duration T. Then, since the prior art method requires a 24 bit read operation followed by a 24 bit write operation, 2T is required, which corresponds to a bandwidth of 1/(2T). Consider now the method of the present invention, in which four memory accesses are required, yielding a lesser bandwidth of 1/(4T). However, in order to make a meaningful comparison of bandwidth, the memory devices must have the same number of input/output (I/O) pins. Taking three 8-bit-wide memory units (which together have 24 pins, as in the prior art case) operating in parallel, the memory bandwidth is actually 3/(4T), corresponding to an increase of 50% over the prior art bandwidth of 1/(2T).

The fact that the memory bandwidth of the present invention is at least that of the prior art not only in the worst case but in all cases can be seen as follows. All possibilities can be classified into one of two cases: (1) the case in which the compare operation ultimately does not result in a write to memory and (2) the case in which it does. In the first case, the prior art method requires access of three bytes. However, for this case the present method requires access of three bytes only if R1=W1 and R2=W2, as seen in FIG. 2. Only one or two memory accesses would be required if R1≦W1 or R2≦W2, respectively. Hence, for case (1), the present method is at least as fast as the prior art method.

In case (2), which corresponds to the worst case treated above, the prior art method requires access of six bytes. However, the present method requires access of only four bytes (i.e., R1, W1, W2, W3; R1, R2, W2, W3; or R1, R2, R3, W3). Hence, for case (2), the present method is 50% faster than the prior art method. Finally, the results for cases (1) and (2) considered together demonstrate that the present method is faster than, i.e., has a higher memory bandwidth than, the prior art method.

Note that the comparisons of both methods made above do not incorporate the time needed for the compare operation. However, the fact that an 8 bit compare operation is at least as fast as, and typically significantly faster than, a 24 bit compare operation supports the conclusion reached above that the present method has a higher bandwidth than the prior art method.

Referring again to FIG. 1, the present implementation employs two comparators to perform the comparisons required by the state machine logic 116. However, the same information provided by the two comparators could alternatively be provided by a single greater than/less than/equals comparator. However, since an equality comparison can be performed significantly faster than a magnitude comparison and since the results of the equality comparison are needed more immediately than the results of the magnitude comparison, the single greater than/less than/equals comparison is decomposed into two comparisons performed in parallel.

To elaborate, referring to FIG. 2, the memory device can be in either memory read mode or memory write mode, depending on the results of an equality comparison and a magnitude comparison. As seen in FIG. 1, the memory device 124 is coupled via a single bus connection to the controller 122 which either reads data from or writes data to the memory device 124. Since data transfer across this bus connection is unidirectional at any given time, the memory device must make a transition from memory read mode to memory write mode and vice-versa as needed so as to avoid bus contention. To do this, the memory device must have a sufficient amount of time to reverse its data path along the bus, where this period of time is reflected by the "nop" state in the FIG. 2 diagram.

Since the decision as to whether or not to reverse the data path, i.e., whether or not to read the next byte, requires only the result of an equality comparison, which is significantly faster than a greater than/less than/equals comparison, the greater than/less than/equals comparison result that is needed eventually is decomposed into a fast equality comparison and a slower magnitude comparison. As a result, the equality result can be used by the state machine logic immediately; the state machine does not have to wait for the results of the composite comparison to obtain the more urgently needed results of the equality comparison. If the z-values are equal, an immediate read is made. If the z-values are not equal, the memory is immediately set in the write mode. The result of the magnitude comparison is then required to determine whether or not to write the current byte of the new z-value to memory, which is already in the write mode.

The two comparison operations (equality and magnitude) are performed in parallel, and their results are sent to the state machine 116 as they become available. This parallelism is instrumental in further increasing the speed of the circuit.

A final means whereby update speed is increased as compared to prior art methods is through the use of the set of INVALID bits in memory 124. Since a major portion of the updating operation is avoided in cases in which INVALID='1', a substantial savings in time can result from this scheme.

This scheme also provides a way to quickly update z-values during a rapid clearing of the graphics screen. Ordinarily, if part or all of the graphics screen were to be cleared, the z-value memory location for each pixel to be cleared would have to be updated, a procedure that would involve three memory accesses (write operations) for each of these pixels. However, using the INVALID bit scheme of the present invention, only the INVALID bits corresponding to these pixels would have to be set to '1', a procedure entailing significantly fewer memory accesses than would otherwise be necessary.

III. Method and Apparatus in a Parallel Implementation

Figure 3:
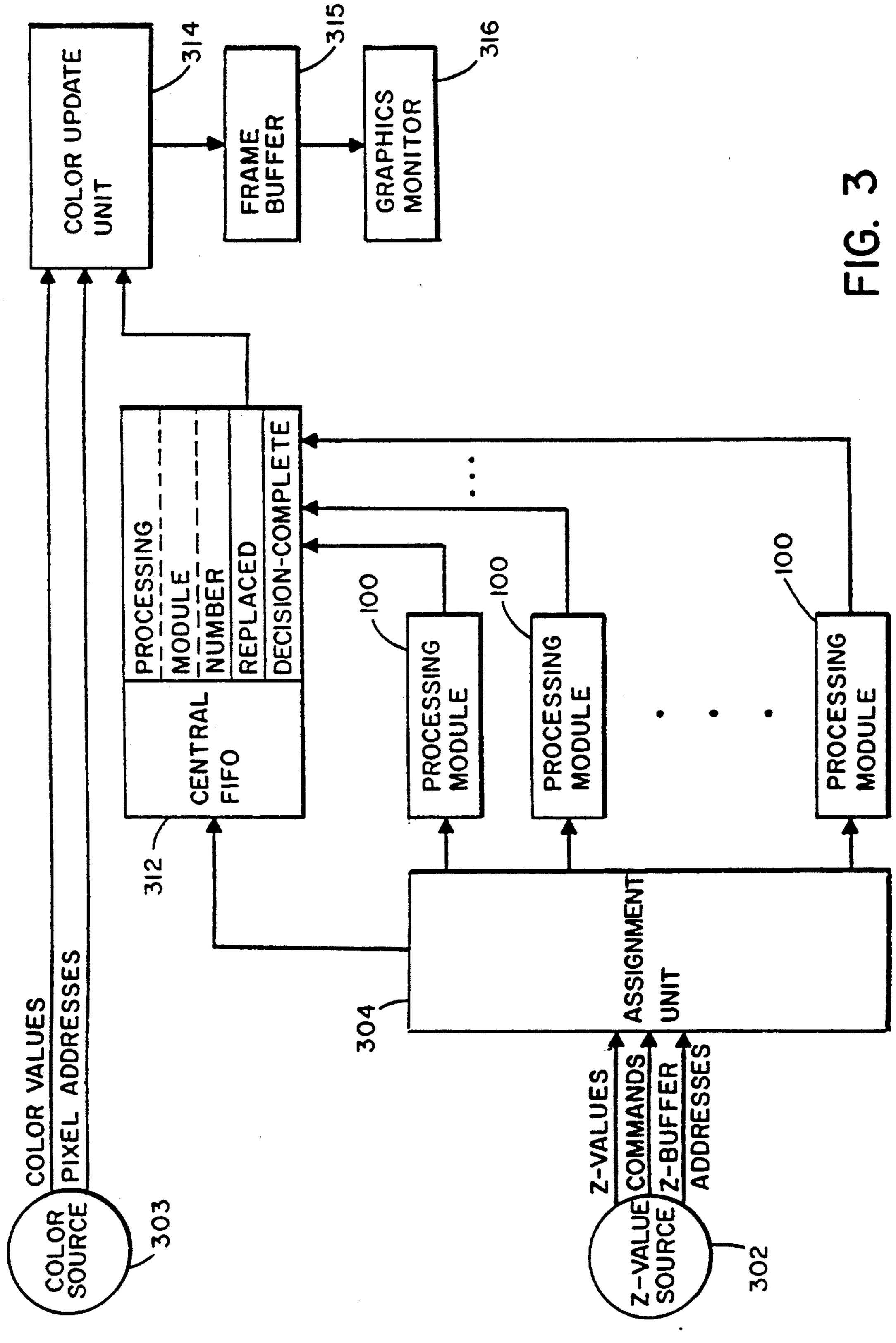
FIG. 3 is a block diagram of the parallel architecture in which a plurality of controller/memory modules are used.

FIG. 3 is a block diagram of the system used to update z-values stored in memory and update colors on a graphics screen, using a plurality of the controller/memory modules described in Section I. The system is comprised of (1) a source 302 of z-values, z-buffer addresses, and commands, such as a computer; (2) a source 303 of colors and pixel addresses; (3) an assignment unit 304; (4) eight processing modules 100, each comprising a controller/memory module 100 as shown in detail in FIG. 1; (5) a central FIFO buffer 312; (6) a color update unit 314; (7) a frame buffer 315; and (8) a graphics monitor 316.

According to what is to be subsequently displayed on the screen, the z-value source 302 provides to the assignment unit 304 a stream of new 24 bit z-values and the z-buffer addresses of the pixels to which they correspond. For a given z-buffer address in the stream, the assignment unit selects the correct one of the eight processing modules 100 using the value of the address. The memory unit 124 (FIG. 1) within the selected processing module 100 contains the old z-value corresponding to the z-buffer address. Within the memory of each processing module, bytes of each z-value are stored at sequential addresses. Because of the assignment performed by logic unit 304, the least significant bits of the z-buffer address are no longer required for access within a module.

The assignment unit then provides the input FIFO 102 (FIG. 1) of the selected processing module with the pixel address and the new z-value and documents its selection of the processing module by placing the number of the processing module, which takes the form of the three least significant bits of the z-buffer address, on the central FIFO 312. The processing module number is accompanied on the central FIFO by two single-bit state variables: REPLACED and DECISION-COMPLETE. These two variables indicate whether or not the new z-value has replaced the old z-value in the entry to which they correspond and whether or not this decision has been made, respectively. DECISION-COMPLETE is initialized to '0', and as long as DECISION-COMPLETE remains '0', the value of REPLACED is meaningless.

As an entry emerges from the input FIFO 102 belonging to its processing module 100, the processing module initiates the read/compare/write operation described in Section I above. Specifically, the controller 122 (FIG. 1) begins by checking the value of the INVALID bit for the given pixel and, depending on its value, either writing the new z-value to memory or initiating the update process described by the state diagram of FIG. 2. At this point, the old z-value either has or has not been replaced by the new z-value, and an indication to that effect is provided to the central FIFO 312. In particular, the oldest entry in the central FIFO 312 corresponding to the current processing module 100 is updated by setting the value of the single bit REPLACED to '1' if a replacement occurred and '0' if one did not. Simultaneously, the value of DECISION-COMPLETE is set to '1'.

Note that this scheme, in general, yields out-of-order completion. That is, the z-value updating for pixels does not necessarily occur in the same order in which the information for the pixels appeared in the stream as received by the assignment unit 304. For example, this phenomenon would occur if a large percentage of of the pixels arriving at the assignment unit had addresses such that they were to be assigned to a particular one of the processor modules 100. In this case, a lengthy queue would form at this processor, and pixels arriving at the assignment unit later but which corresponded to other processing modules would be updated before those pixels queued at the crowded processor. Further, pixels processed by certain processors may result in quicker "done" states. Permitting out-of-order completion clearly avoids the possibility of forming queues at all processors when queues have formed at a few busy processors and consequently allows the eight processor parallelism to be fully exploited.

Once the entry at the front of the central FIFO 312 has DECISION-COMPLETE='1', the entry is removed from the FIFO 312 and the value of the REPLACED bit is provided to the color update unit 314. The source 303 provides color values and pixel addresses to the color update unit 314, with these color values and pixel addresses being in the same order, i.e., corresponding to, the REPLACED bits arriving at unit 314. Unit 314 determines whether the color is to be rendered on the graphics monitor 316 based on the value of REPLACED. This determination is passed on to the frame buffer 315 which is coupled to graphics monitor 316.

Equivalents

While the invention has been particularly shown and described with reference to preferred embodiment thereof, it will be understood by those skilled in the art that various changes in form and details may be made without departing from the spirit and scope of the invention as defined in the appended claims. For example, the various components of the system may be implemented using hardwired logic circuitry or programmed processors but are preferably hardwired for speed. Also, logic circuits shown and claimed individually may be implemented in common circuits.

I claim:

1. A system for updating the z-values corresponding to pixels of a computer graphics screen, comprising:

a) memory storing old z-values representing depths at pixel locations;

b) access logic for receiving new z-values for pixels of the graphics screen and accessing portions of old z-values for the pixels from memory;

c) a portion comparator that compares a portion of a new z-value with a corresponding portion of an old z-value accessed from memory; and d) decision logic that, based on the output of the portion comparator, causes the access logic to perform one of the functions of (1) replacing the old z-value by the new z-value, (2) causing access of and a comparison of another portion of the old z-value from memory, and (3) ending updating of the old z-value.

2. A system as claimed in claim 1 wherein a plurality of processors operate in parallel, each comprising the memory, access logic, portion comparator, and decision logic, with each pixel of the graphics screen being preassigned to one of the processors.

3. A system as claimed in claim 1 wherein the access logic replaces the old z-value by the new z-value by replacing only the portion of the z-value last compared by the portion comparator and all portions of the z-value not yet compared by the portion comparator.

4. A system as claimed in claim 1 wherein the portion comparator comprises a first comparator that determines whether the binary values of the two portions are equal and a second comparator that determines whether the binary value of one portion is greater than the binary value of the other portion, both comparators operating in parallel.

5. A system as claimed in claim 1 wherein the access logic further reads from memory for each pixel the value of a validity indication, which indicates whether the old z-value in memory is valid, and writes a new z-value to memory without comparison and switches in memory the value of the validity indication if the old z-value is not valid.

6. A system as claimed in claim 5 wherein the validity indications for certain pixels may be set to facilitate rapid elimination of pixel data from the graphics screen without writing the new z-values.

7. A method of updating the z-values representing depths at pixel locations of a computer graphics screen, comprising:

a) providing a new z-value for a pixel of the graphics screen;

b) partitioning the new z-value into portions;

c) performing an update of z-values by:

i) comparing a most significant portion of the new z-value with a corresponding portion of a previously stored z-value; and ii) based on the result of the step of comparing, performing one of the functions of (1) replacing the previously stored z-value by the new z-value, (2) repeating steps (i) and (ii) for a next most significant portion of the z-value, and (3) ending the comparison.

8. A method as claimed in claim 7 wherein the steps of partitioning and performing an update are performed by a plurality of processors operating in parallel, with each pixel of the graphics screen being preassigned to one of the processors.

9. A method as claimed in claim 7 wherein the previously stored z-value is replaced by the new z-value by replacing only the portion of the z-value compared in that step of comparing and all portions of the z-value not yet compared.

10. A method as claimed in claim 7 wherein the step of comparing comprises performing a first comparison to determine whether the binary values of the two portions are equal and a second comparison to determine whether the binary value of a first portion is greater than the binary value of a second portion, both comparison steps being performed in parallel.

11. A method as claimed in claim 10 wherein the result of the first comparison determines whether another portion of the previously stored z-value is read from memory.

12. A method as claimed in claim 10 wherein the result of the second comparison determines whether the portion of the new z-value being compared and all portions not yet compared are written to memory.

13. A method as claimed in claim 7 wherein the step of comparing the two z-values is preceded by reading from memory a validity indication, which indicates whether the old z-value in memory is valid, and writing a new z-value to memory without comparison and switching in memory the value of the validity indication if the old z-value is not valid.

14. A method as claimed in claim 13 wherein the validity indications for certain pixels may be set to facilitate rapid elimination of pixel data from the graphics screen without writing of new z-values.

* * * * *